2,808,400
Patented Oct. 1, 1957

2,808,400
AZO DYES AND PIGMENTS

William S. Struve, Carney's Point, N. J., and Albert D. Reidinger, Wilmington, Del., assignors to E. I. du Pont de Nemours and Company, Wilmington, Del., a corporation of Delaware No Drawing. Application August 21, 1953, Serial No. 375,835

9 Claims. (Cl. 260—202)

This invention relates to a new series of azo dyes and precipitated azo pigments. More specifically, it relates to a new series of azo dyes and pigments obtained by the diazotization, coupling and salt formation of the amino compounds having the formula:

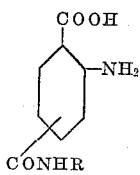

wherein R is a nucleus from the group consisting of benzene, naphthalene and substituted benzene and napthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine and nitro radicals, and the —CONHR group may be in a position, with respect to the carboxy group, consisting of the 4, 5 and 6 positions.

In copending application Serial No. 375,834, filed of even date herewith, there is disclosed and claimed the above-described class of amino compounds.

It is the object of this invention to prepare a new series of azo dyes and precipitated azo pigments from these amino compounds. It is a further object to produce precipitated azo pigments having an improved resistance to bleeding, particularly in alkaline aqueous reagents, and which exhibit highly desirable tinctorial properties including brightness and intensity of shade.

These new dyes and pigments may be obtained by conventional diazotization, coupling and salt formation processes with the aforesaid new class of amino compounds. For example, such amino compounds may be diazotized by dissolving the same in dilute aqueous alkali, adding sodium nitrite and running the mixture into dilute acid maintained at a low temperature and stirring until diazotization is complete.

The diazo compound may be added slowly to a solution of any of the common coupling components, for example, 3-hydroxy-2-naphthoic acid. The resulting dyestuff may be isolated and then reslurried in water for conversion to the metal salt or it may be converted directly without intermediate isolation. A number of metals are useful for this purpose, but the strontium salt seems to be especially useful both as to desirable color and intensity of color shade, and also as to the economic value.

The following examples are illustrative of procedures which may be used. Following these detailed examples is found a table listing many of the combinations which have been made, together with the tinctorial properties of the various metal salts thereof.

Example I 25.6 parts of 2-amino-terephthalanilic acid were dissolved at about 60° C. in 350 parts of water with 4.1 parts of sodium hydroxide. After adjusting to a volume equivalent to 500 parts of water at about 30° C., 7.1 parts of sodium nitrite were dissolved and added. The mixture was then run into 12.4 parts of hydrochloric acid (100%), the temperature of which was maintained at 0–2° C. by the addition of ice, while maintaining vigorous agitation.

Twenty (20) parts of 2-hydroxy-3-naphthoic acid were dissolved at 60° C. in 120 parts of water containing 8.8 parts of sodium hydroxide. Sixteen (16) parts of sodium carbonate dissolved in 75 parts of warm water were then added and the mixture adjusted with ice to 10° C. at a volume equivalent to 600 parts of water.

The diazo suspension was then added to the solution of 3-hydroxy-2-naphthoic acid in about thirty minutes, and the resulting dyestuff filtered off and washed with aqueous 5% sodium chloride solution.

The isolated dyestuff was reslurried in 2500 parts of water. To the suspension were added in turn 3.6 parts of Turkey red oil dispersed in 20 parts of water, 7.5 parts of sodium acetate ($Na_2C_2H_3O_2 \cdot 3H_2O$) dissolved in 25 parts of water and 25 parts of manganese sulphate (100%) dissolved in 200 parts of warm water, followed by 2 parts of sodium hydroxide (100%). The slurry was then heated to the boil and boiled for two minutes after which the pigment was filtered, washed and dried. The resulting product was an intense, red pigment of superior light-fastness and excellent resistance to bleed in alkaline solutions. It has the following structural formula:

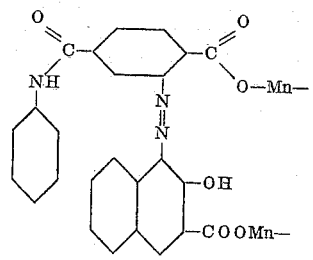

Example II

The dystuff prepared as in Example I can be converted to the calcium toner by substituting 22 parts of calcium chloride flakes for the manganese sulphate and heating at 90° C. for thirty minutes.

The product obtained is an intense red pigment having good light-fastness and excellent resistance to bleed in solvents to which lithographic inks are likely to be subjected. For example, in hot water it was superior to commercial products which are considered outstanding in this property and in addition it exhibited much better resistance to alkaline solutions than is usually shown by precipitated pigments of this type. This product has the same formula as that shown in Example I except that calcium is substituted for manganese in the formula.

Example III

The dyestuff prepared as in Example I can be converted to the strontium toner by substituting 26 parts of strontium nitrate for the manganese sulphate and heating at 80° C. for ten minutes. This product was also an intense red pigment possessing light-fastness and bleed resistance. The strontium toner has the same formula as that shown in Example I except that strontium is substituted for manganese in the formula.

All the pigments from 2-amino-terephthalanilic acid were brighter and stronger than the corresponding products obtainable from 2-amino-isophthalanilic acid. A marked superiority also was found in resistance to bleeding in hot water.

Example IV

Twenty-seven (27) parts of 2-amino-2'-methyl terephthalanilic acid were dissolved at about 60° C. in 600 parts of water with 4.1 parts of sodium hydroxide. After adjusting to a volume equivalent to 1000 parts of water at 35°–40° C., the amine was diazotized and coupled to 3-hydroxy-2-naphthoic acid by the procedure of Example I. The resulting dye has the following structural formula:

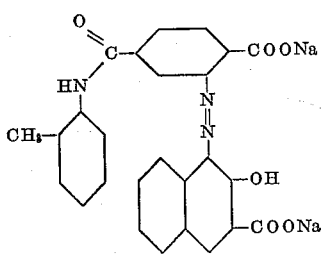

The coupled dyestuff was converted to the manganese, calcium, and strontium toners by the methods described in the preceding examples. The resulting pigments were comparable to those obtained from 2-amino terephthalanilic acid in respect to tinctorial properties, light-fastness and bleed resistance.

Example V

Dyestuff prepared from 2-amino-2'-methyl terephthalanilic acid by diazotization and coupling to 3-hydroxy-2-naphthoic acid was also converted to the barium toner by substituting, in the method of Example I, 34 parts of barium chloride crystals for the manganese sulphate and heating at 90° C. for thirty minutes.

The pigment thus obtained was slightly bluer in shade than the calcium or strontium derivatives, but was equally resistant to light and solvents.

Example VI

Thirty-five (35) parts of 2-amino-2',4'-dimethoxy-5'-chloro terephthalanilic acid were dissolved at about 60° C. in 700 parts of water containing 4.1 parts of sodium hydroxide. 7.1 parts of sodium nitrite were dissolved and added, and the mixture at about 60° C. was then run into 12.1 parts of hydrochloric acid (100%), the temperature of which was maintained at 0–2° C. by addition of ice.

Thirty (30) parts of 3-hydroxy-2-naphthoic acid were dissolved at 60° C. in 150 parts of water containing 8.8 parts of sodium hydroxide. Sixteen (16) parts of sodium carbonate dissolved in 75 parts of warm water were then added and the mixture adjusted with ice to 10° C. at a volume equivalent to 600 parts of water.

The diazo suspension was then added to the solution of 3-hydroxy-2-naphthoic acid in about 30 minutes, more water being added as needed to permit agitation of the coupling mixture. The resulting dyestuff was acidified with about 18 parts of hydrochloric acid (100%) and stirred for thirty minutes. 3.6 parts of Turkey red oil dispersed in 20 parts of water and 7.0 parts of sodium acetate ($NaC_2H_3O_2 \cdot 3H_2O$) dissolved in 25 parts of water were added and the dyestuff made slightly alkaline with about 14 parts of sodium hydroxide (100%). Twenty-six (26) parts of strontium nitrate dissolved in 200 parts of warm water were then added. The slurry was then heated to boil and boiled for 2 minutes after which the pigment was filtered, washed and dried.

The resulting product was a deep, intense, bluish-red pigment possessing good light-fastness and useful for coloration of automotive enamels. This product was much more intense than the corresponding pigment obtained from 2-amino-2',4'-dimethoxy-5'-chloroisophthalanilic acid.

This pigment as well as comparable pigments containing barium, calcium or manganese instead of strontium, and derived from 2-amino-2',-4'-dimethoxy-5'-chloro terephthalanilic acid by the methods of this example, were intense, bluish-reds having good light-fastness and excellent resistance to bleed in solvents to which lithographic inks are likely to be subjected. In addition, they showed unusual resistance to alkali and also to soap and detergent solutions.

These pigments have the following structural formula:

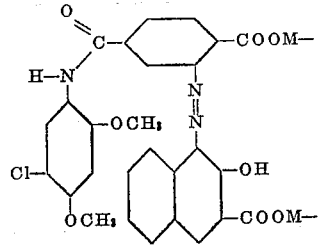

where M— is a bivalent metal cation which is probably attached to another dye molecule.

Example VII 25.6 parts of 2-amino-terephthalanilic acid were dissolved at about 60° C. in 500 parts of water with 4.1 parts of sodium hydroxide (100%). After adjusting to a volume equivalent to 700 parts of water at about 30° C., 7.1 parts of sodium nitrite were dissolved and added. The mixture was then run into 12.4 parts of hydrochloric acid (100%), the temperature of which was maintained at 0–2% C. by the addition of ice.

Fifteen (15) parts of beta-naphthol were dissolved at about 60° C. in 120 parts of water containing 8 parts of sodium hydroxide (100%). Sixteen (16) parts of sodium carbonate dissolved in 75 parts of warm water were then added and the mixture adjusted with ice to 10° C. at a volume equivalent to 600 parts of water.

The diazo suspension was then added to the solution of beta-naphthol in about thirty minutes and the resulting dyestuff filtered and washed with 5% salt solution.

The isolated dyestuff was reslurried in 2500 parts of water. To the suspension was added in turn 3.6 parts of Turkey red oil dispersed in 20 parts of water, 7.6 parts of sodium acetate ($NaC_2H_3O_2 \cdot 3H_2O$) dissolved in 25 parts of water and 26 parts of strontium nitrate, dissolved in 200 parts of water, followed by two parts of sodium hydroxide (100%). The slurry was then heated to 90° C., stirred for 20 minutes, filtered, washed, and dried.

The resulting product was an orange pigment possessing excellent light-fastness and excellent resistance to hot water and alcohol.

The corresponding products containing barium, calcium and manganese in place of strontium are also intense orange pigments of excellent light-fastness and resistance to bleeding in various solvents. These pigments have the following structural formula:

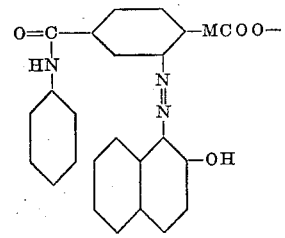

wherein M— is a bivalent metal cation which is probably attached to another dye molecule.

Example VIII

Twenty-seven (27) parts of 2-amino-2'-methyl-terephthalanilic acid were dissolved at about 60° C. in 600 parts of water with 4.1 parts of sodium hydroxide. After adjusting to a volume equivalent to 1000 parts of water at 45° C., the amine was diazotized and coupled to beta-naphthol by the procedure by Example VII.

The coupled dyestuff was converted to manganese, calcium, barium, and strontium toners by the methods described in the preceding examples. The resulting products were orange pigments and have the following structural formula:

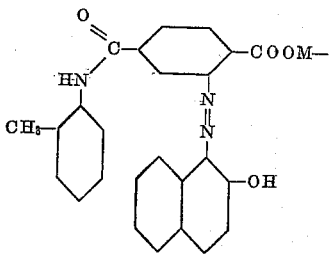

wherein M— is a bivalent metal cation which is probably attached to another dye molecule.

*Example IX*

Twenty-seven (27) parts of 2-amino-2'-methyl-terephthalanilic acid were dissolved at about 60° C. in 600 parts of water with 4.1 parts of sodium hydroxide (100%). After adjusting to a volume equivalent to 1000 parts of water at 45° C., 7.1 parts of sodium nitrite were dissolved and added. The mixture was then run into 12.4 parts of hydrochloric acid (100%), the temperature of which was maintained at 0–2° C. by the addition of ice.

18.2 parts of aceto-acetanilide were dissolved at about 25° C. in 400 parts of water with 8 parts of sodium hydroxide (100%). Twelve (12) parts of glacial acetic acid were added, followed by 27 parts of sodium acetate crystals.

The diazo suspension was then added in about 30 minutes. The resulting dyestuff was made alkaline by the addition of sodium hydroxide and filtered. The isolated dyestuff was reslurried in 1500 parts of water and heated to 60° C. After the suspension had been cooled to about 30° C., 3.6 parts of Turkey red oil dispersed in 20 parts of water, and 7.6 parts of sodium acetate crystals dissolved in 25 parts of water were added, followed by 26 parts of strontium nitrate dissolved in 200 parts of water and two parts of sodium hydroxide (100%). The slurry was then heater to 90° C., stirred for 20 minutes, filtered, washed, and dried.

The resulting product was a greenish-yellow pigment having the following structural formula:

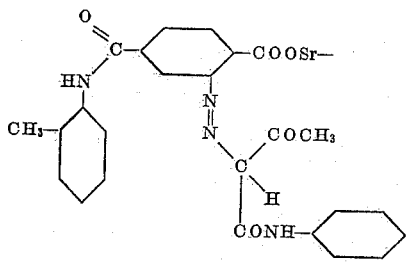

*Example X*

Twenty-seven (27) parts of 2-amino-2'-methyl-terephthalanilic acid were dissolved at about 60° C. in 600 parts of water with 4.1 parts of sodium hydroxide (100%). After adjusting to a volume equivalent to 1000 parts of water at 45° C., 7.1 parts of sodium nitrite were dissolved and added. The mixture was then run into 12.4 parts of hydrochloric acid (100%), the temperature of which was maintained at 0–2° C. by the addition of ice.

Nineteen (19) parts of 1-phenyl-3-methyl-5-pyrazolone were dissolved in 100 parts of water with 8 parts of sodium hydroxide (100%). Sixteen (16) parts of sodium carbonate dissolved in 75 parts of warm water were then added and the mixture adjusted with ice to 5° C.

The diazo suspension was then added in about thirty minutes and the resulting dyestuff filtered and washed with 5% brine solution.

The isolated dyestuff was reslurried in 2500 parts of water. To the suspension were added in turn 3.6 parts of Turkey red oil dispersed in 20 parts of water, 7.6 parts of sodium acetate crystals dissolved in 25 parts of water, and 26 parts of strontium nitrate dissolved in 200 parts of water, followed by two parts of sodium hydroxide (100%). The slurry was then heated to 90° C., stirred for 20 minutes, filtered, washed and dried.

The resulting product was a reddish-yellow pigment possessing very good light-fastness. It has the following structural formula:

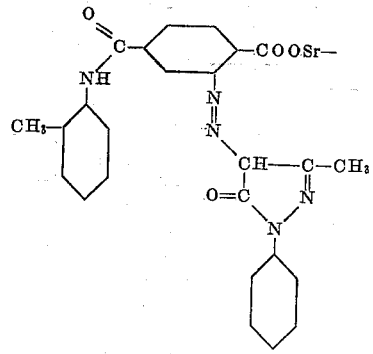

*Example XI*

Twenty-seven (27) parts of 2-amino-2'-methyl-terephthalanilic acid were dissolved at about 60° C. in 600 parts of water with 4.1 parts of sodium hydroxide (100%). After adjusting to a volume equivalent to 1000 parts of water at 45° C., 7.1 parts of sodium nitrite were dissolved and added. The mixture was then run into 12.4 parts of hydrochloric acid (100%), the temperature of which was maintained at 0–2° C. by the addition of ice.

28.4 parts of the o-toluidide of 3-hydroxy-2-naphthoic acid were dissolved in 120 parts of water at 80° C. with 8 parts of sodium hydroxide (100%). Sixteen (16) parts of sodium carbonate dissolved in 75 parts of warm water were then added and the mixture adjusted to 20° C. at a volume equivalent to 600 parts of water.

The diazo suspension was then added to the solution of the coupling component in about 30 minutes and the resulting dyestuff was heated to 60° C., filtered and washed with 5% salt solution.

The isolated dyestuff was reslurried in 2500 parts of water. To the suspension was added in turn 3.6 parts of Turkey red oil dispersed in 20 parts of water, 7.6 parts of sodium acetate crystals dissolved in 25 parts of water, and 25 parts of manganese sulphate (100%) dissolved in 200 parts of water, followed by 2 parts of sodium hydroxide (100%). The slurry was then heated to 90° C., stirred for 20 minutes, filtered, washed and dried.

The product is a yellowish-red pigment of good light-fastness having the following structural formula:

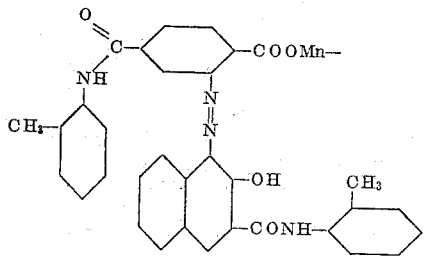

*Example XII*

Twenty-six (26) parts of 2-amino-terephthalanilic acid were diazotized as in Example I.

30.8 parts of the p-anisidide of 3-hydroxy-2-naphthoic acid were dissolved at 90° C. in 200 parts of water containing 11 parts of sodium hydroxide (100%). The solution was then adjusted to 15° C. at a volume equivalent to 600 parts of water and the diazo suspension added in about 30 minutes. The coupled dyestuff was heated to 80° C., filtered, and washed with a small amount of 5% salt solution.

The isolated soda salt was reslurried in about 500 parts of water. To the suspension was added 26 parts of copper sulphate crystals dissolved in 100 cc. of warm water, followed by 20–25 grams of diethanolamine. The slurry was then heated to 90° C. and stirred for two hours at 90° C., after which the pigment was filtered, washed and dried to give a maroon pigment of excellent light-fastness and superior durability in automotive enamels. It has the following structural formula:

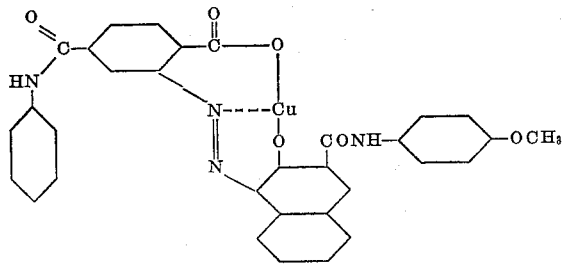

tate crystals dissolved in 50 parts of water were added, followed by 18 parts of nickel chloride crystals dissolved in 80 parts of water. Heating was continued for two hours during which sodium hydroxide was added to maintain a neutral test on litmus paper.

The resulting golden brown pigment possessed excellent light-fastness. It has the following structural formula:

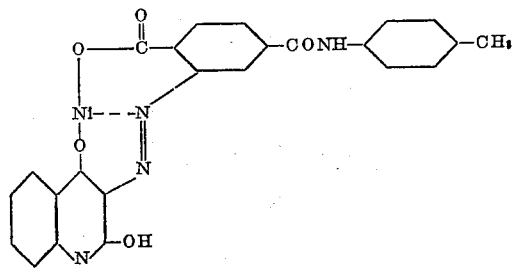

The following table summarizes many combinations which have been made within the scope of this invention together with the properties of many of the metallic salts of these azo dyes. This table illustrates the wide scope of this invention and the invention is not to be limited to the specific combination shown.

| Diazo Component | Coupling Component | Shade of Metallic Derivative | | | |
|---|---|---|---|---|---|
| | | Manganese | Calcium | Barium | Strontium |
| Derivative of 2-aminoterephthalanilic acid: | | | | | |
| 3' methyl | 3-hydroxy-2-naphthoic acid. | dark red | dark red | | intense yellowish red. |
| 4' methyl | ___do___ | med. red | intense yellowish red. | | Do. |
| 2' methoxy | ___do___ | dark bluish maroon | dark red | | Do. |
| 4' methoxy | ___do___ | med. red | yellowish red | | yellowish red. |
| 2' chloro | ___do___ | yellowish maroon | dark yellowish red | | dark yellowish red. |
| 3' chloro | ___do___ | intense yellowish maroon | ___do___ | | yellowish red. |
| 4' chloro | ___do___ | med. red | yellowish red | | Do. |
| 2'5' dichloro | ___do___ | yellowish maroon | dark red | med. red | medium red. |
| 2'4' dimethyl | ___do___ | bluish red | med. red | | yellowish red. |
| 2'5' dimethyl | ___do___ | dark red | yellowish red | | intense red. |
| 3'4' dimethyl | ___do___ | ___do___ | dark red | | medium red. |
| 2'5' dimethoxy | ___do___ | bluish maroon | maroon | | yellowish red. |
| 3' chlor-4' methyl | ___do___ | dark red | dark red | | dark red. |
| 3' chlor-6' methyl | ___do___ | dark intense red | intense red | | intense red. |
| 3' chlor-4' methoxy | ___do___ | dark red | yellowish red | | yellowish red. |
| 3' chlor-6' methoxy | ___do___ | bluish maroon | intense red | | intense red. |
| 3' methyl-6' methoxy | ___do___ | ___do___ | maroon | intense red | Do. |
| 2'5' dimethoxy 4' chloro | ___do___ | medium maroon | dark yellowish red | light red | light red. |

*Example XIII*

Twenty-seven (27) parts of 2-amino-4'-methyl-terephthalanilic acid were dissolved at about 70° C. in 600 parts of water with 4.1 parts of sodium hydroxide (100%). After adjusting to a volume equivalent to 800 parts of water at 35° C., 7.1 parts of sodium nitrite were dissolved and added. The mixture was then run into 12.4 parts of hydrochloric acid (100%), the temperature of which was maintained at 0–2° C. by the addition of ice.

Seventeen (17) parts of 2,4-dihydroxy quinoline (100%) were dissolved at room temperature in 400 parts of water. Seventeen (17) parts of sodium carbonate dissolved in 100 parts of water were then added and the mixture adjusted with ice to 20° C.

The diazo suspension was added in about 30 minutes. To the coupled dyestuff, sufficient salt was added to form a 5% solution, followed by 11 parts of hydrochloric acid (100%). After stirring for thirty minutes the slurry was made alkaline with about 6.4 parts of sodium hydroxide (100%) and then filtered and washed with 5% brine solution.

The isolated dyestuff was reslurried in about 1000 parts of water and heated to 90° C. 13.6 parts of sodium ace- The products similar to 2-amino-terephthalanilic acid in which a naphthylamine has replaced aniline have also been made and coupled with 3-hydroxy-2-naphthoic acid.

2-amino-N-1 naphthyl-terephthalamic acid:
 Manganese salt—bluish maroon
 Calcium salt—dark red
 Strontium salt—intense red 2-amino-N-2-naphthyl terephthalamic acid:
 Manganese salt—maroon
 Calcium salt—yellowish-red
 Strontium salt—yellowish-red Derivatives of isophthalanilic acid:

| | Manganese | Calcium | Strontium |
|---|---|---|---|
| 2-amino-2',4'-dimethoxy-5'-chloro isophthalanilic acid. | very dull maroon. | very dull red. | very dull maroon. |
| 2-amino-isophthalanilic acid | dull maroon. | dull maroon. | dull maroon. |

This invention is not to be restricted to any specific method of diazotization or coupling of these azo dyes. These operations are conventional and may be varied by the skilled operator. Likewise, the conversion to the metal salt may be carried out in many ways and within various pH ranges. These variations may affect the color of the products but all such products are encompassed within the broad scope of this invention. The examples show the isolation of the azo dyes prior to their conversion to the metal salt, but the dyes may be converted directly without isolation.

As the salt-forming metal in the final pigment, strontium is preferred but the other alkaline earth metals are also applicable. Likewise, manganese, iron, copper, nickel, cobalt, and chromium have utility under special conditions and such compounds are contemplated as being within this invention.

This invention also includes the numerous modifications of the diazo component which will be obvious to the worker skilled in the synthesis of organic compounds. For instance, substituent groups may be present on the terephthalic acid residue and might include alkyl, alkoxy, chlorine, bromine, or nitro groups. Likewise, it is contemplated that diamino compounds may be used in forming the amide group on the terephthalic acid and thus enable the condensation with two molecules of the amino terephthalic acid to form high molecular weight diamino derivatives capable of forming diazo dyes. Thus, para phenylene diamine or benzidine might be used in place of aniline and they, in turn, could be further substituted.

No water solubilizing groups other than the carboxy group have been shown in any of the examples. In general, such additional water solubilizing groups, as the sulfonic acid group, would be undesirable for pigment purposes because of an increased tendency toward water bleed. However, such groups might confer desirable properties for other uses such as textile dyeing and it is contemplated that dyes containing such groups, whether on the terephthalic acid residue or on the second coupling component, are within the scope of the invention.

The products of this invention are useful as new pigments because of their intense color, excellent light-fastness and excellent resistance to bleeding in various solvents.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

We claim:

1. As compositions of matter the azo pigments having the formula:

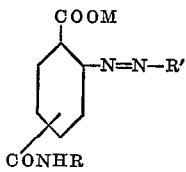

wherein M is a cation from the group consisting of manganese, calcium, barium, strontium, copper, nickel, iron, alkali metals, and hydrogen; wherein R is a nucleus from the group consisting of benzene, naphthalene and substituted benzene and naphthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine, and nitro radicals, and the —CONHR group may be in a position, with respect to the carboxy group, consisting of the 4, 5 and 6 positions; and wherein R' is an azo pigment coupling component.

2. As a composition of matter, the azo pigments having the formula:

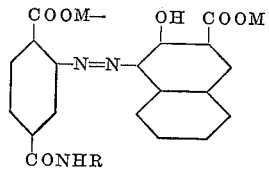

wherein M is a cation from the group consisting of manganese, calcium, barium, strontium, copper, nickel, iron, alkali metals, and hydrogen, and R is a nucleus from the group consisting of benzene, naphthalene and substituted benzene and naphthalene nuclei and wherein the substituents of the substituted benzene and naphthalene nuclei are taken from the class consisting of alkyl radicals of 1 to 6 carbon atoms, alkoxy radicals of 1 to 6 carbon atoms, chlorine, bromine, and nitro radicals.

3. As a composition of matter, the azo pigments defined by claim 1 in which M is strontium.

4. As a composition of matter, the azo pigments defined by claim 2 in which M is strontium.

5. As a composition of matter, the azo pigments defined by claim 1 in which R is a phenyl group.

6. As a composition of matter, the azo pigments defined by claim 1 in which R is a 2-methyl phenyl group.

7. As a composition of matter, the azo pigments defined by claim 1 in which R is a 2-4 dimethoxy-5-chloro phenyl group.

8. As a composition of matter, the azo pigment having the formula:

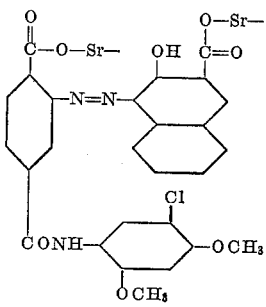

9. As a composition of matter, the azo pigment having the formula:

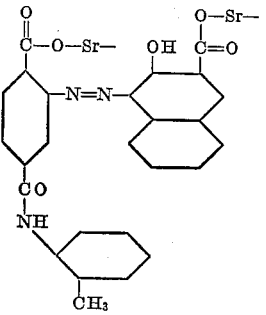

References Cited in the file of this patent

UNITED STATES PATENTS

| | | |
|---|---|---|
| 2,064,332 | Zwilgmeyer | Dec. 12, 1936 |
| 2,228,303 | Fischer | Jan. 14, 1941 |
| 2,353,675 | Knecht | July 18, 1944 |
| 2,606,185 | Widmer | Aug. 5, 1952 |
| 2,649,383 | Killian et al. | Aug. 18, 1953 |

OTHER REFERENCES

Pratt, Organic Pigments, 1947, pgs. 117 and 128.